United States Patent
Kim et al.

(10) Patent No.: US 11,366,978 B2
(45) Date of Patent: Jun. 21, 2022

(54) DATA RECOGNITION APPARATUS AND METHOD, AND TRAINING APPARATUS AND METHOD

(71) Applicant: Samsung Electronics Co., Ltd., Suwon-si (KR)

(72) Inventors: Insoo Kim, Seongnam-si (KR); Kyuhong Kim, Seoul (KR); Chang Kyu Choi, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 524 days.

(21) Appl. No.: 16/295,400

(22) Filed: Mar. 7, 2019

(65) Prior Publication Data
US 2020/0125820 A1    Apr. 23, 2020

(30) Foreign Application Priority Data
Oct. 23, 2018    (KR) .................. 10-2018-0126436

(51) Int. Cl.
| | |
|---|---|
| G10L 15/16 | (2006.01) |
| G10L 17/02 | (2013.01) |
| G10L 17/04 | (2013.01) |
| G06K 9/00 | (2022.01) |
| G06N 20/10 | (2019.01) |
| G06K 9/62 | (2022.01) |
| G06N 3/08 | (2006.01) |
| G10L 15/02 | (2006.01) |
| G10L 17/18 | (2013.01) |

(52) U.S. Cl.
CPC ....... *G06K 9/0055* (2013.01); *G06K 9/00523* (2013.01); *G06K 9/6269* (2013.01); *G06N 3/08* (2013.01); *G06N 20/10* (2019.01); *G10L 15/02* (2013.01); *G10L 15/16* (2013.01); *G10L 17/02* (2013.01); *G10L 17/04* (2013.01); *G10L 17/18* (2013.01)

(58) Field of Classification Search
CPC .......... G10L 15/16; G10L 17/02; G10L 17/04
See application file for complete search history.

(56) References Cited

U.S. PATENT DOCUMENTS

| | | |
|---|---|---|
| 6,625,303 B1 | 9/2003 | Young et al. |
| 7,869,997 B2 | 1/2011 | Atal |

(Continued)

FOREIGN PATENT DOCUMENTS

| | | |
|---|---|---|
| CN | 108171319 A | 6/2018 |
| WO | WO 00/72267 A1 | 11/2000 |

OTHER PUBLICATIONS

Heigold, G., Moreno, I., Bengio, S., & Shazeer, N. (Mar. 2016). End-to-end text-dependent speaker verification. In 2016 IEEE International Conference on Acoustics, Speech and Signal Processing (ICASSP) (pp. 5115-5119). IEEE.*

(Continued)

*Primary Examiner* — Bryan S Blankenagel
(74) *Attorney, Agent, or Firm* — NSIP Law

(57) ABSTRACT

A data recognition method includes: extracting a feature map from input data based on a feature extraction layer of a data recognition model; pooling component vectors from the feature map based on a pooling layer of the data recognition model; and generating an embedding vector by recombining the component vectors based on a combination layer of the data recognition model.

17 Claims, 12 Drawing Sheets

(56) References Cited

U.S. PATENT DOCUMENTS

| | | | |
|---|---|---|---|
| 9,495,970 | B2 | 11/2016 | Dickins et al. |
| 9,565,398 | B2 | 2/2017 | Wixson et al. |
| 9,978,374 | B2 | 5/2018 | Heigold et al. |
| 10,282,641 | B2* | 5/2019 | Jain .................. G06K 9/481 |
| 2006/0009978 | A1 | 1/2006 | Ma et al. |
| 2014/0325254 | A1* | 10/2014 | Mani .................. G06F 16/285 714/2 |
| 2018/0075343 | A1 | 3/2018 | van den Oord et al. |
| 2019/0122111 | A1* | 4/2019 | Min .................. G06N 3/0481 |
| 2020/0035222 | A1* | 1/2020 | Sypniewski ......... G06K 9/6256 |
| 2020/0167914 | A1* | 5/2020 | Stamatoyannopoulos .................. G06N 20/00 |
| 2021/0334656 | A1* | 10/2021 | Sjögren ............... G06K 9/6215 |

OTHER PUBLICATIONS

Lin, Min et al., Network in Network, arXiv preprint arXiv:1312.4400, Dec. 19, 2013 (pp. 1-10).

Variani, Ehsan et al., "Deep Neural Networks for Small Footprint Text-Dependent Speaker Verification", *2014 IEEE International Conference on Acoustics, Speech and Signal Processing (ICASSP)*, May 2014 (pp. 4080-4084).

He, Kaiming et al., "Deep Residual Learning for Image Recognition", *2016 IEEE Conference on Computer Vision and Pattern Recognition (CVPR)*, 2016 (pp. 770-778).

Zhou, Bolei et al., "Learning Deep Features for Discriminative Localization", *2016 IEEE Conference on Computer Vision and Pattern Recognition (CVPR)*, 2016 (pp. 2921-2929).

Snyder, David, et al. "Deep Neural Network Embeddings for Text-Independent Speaker Verification." *Interspeech*, Aug. 20-24, 2017 (pp. 999-1003).

Nagrani, Arsha, et al., "VoxCeleb: a large-scale speaker identification dataset." arXiv preprint arXiv:1706.08612, May 30, 2018 (6 pages in English).

Zhang, Shi-Xiong et al. "End-To-End Attention Based Text-Dependent Speaker Verification", *2016 IEEE Spoken Language Technology Workshop (SLT)*, Dec. 2016, (pp. 171-178).

Chowdhury, F. A. Rezaur Rahman et al. "Attention-Based Models for Text-Dependent Speaker Verification", *2018 IEEE International Conference on Acoustics, Speech and Signal Processing (ICASSP)*, Apr. 2018, (pp. 5359-5363).

Extended European Search Report dated Dec. 17, 2019 in corresponding European Patent Application No. 19172124.0 (7 pages in English).

* cited by examiner

DATA RECOGNITION APPARATUS AND METHOD, AND TRAINING APPARATUS AND METHOD This application claims the benefit under 35 USC § 119(a) of Korean Patent Application No. 10-2018-0126436 filed on Oct. 23, 2018, in the Korean Intellectual Property Office, the entire disclosure of which is incorporated herein by reference for all purposes.

BACKGROUND

1. Field

The following description relates to data recognition.

2. Description of Related Art

Technological automation of data recognition has been implemented through a processor implemented neural network model, as a specialized computational architecture, that after substantial training may provide computationally intuitive mappings between input patterns and output patterns. The trained capability of generating such mappings may be referred to as a learning capability of the neural network. Further, because of the specialized training, such specially trained neural network may thereby have a generalization capability of generating a relatively accurate output with respect to an input pattern for which the neural network may not have been trained, for example. However, because such operations or applications are performed through such specialized computation architecture, and in different automated manners than they would have been performed in non-computer implemented or non-automated approaches, they also invite problems or drawbacks that only occur because of the automated and specialized computational architecture manner by which they are implemented.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a data recognition method includes: extracting a feature map from input data based on a feature extraction layer of a data recognition model; pooling component vectors from the feature map based on a pooling layer of the data recognition model; and generating an embedding vector by recombining the component vectors based on a combination layer of the data recognition model.

The data recognition method may further include: recognizing the input data based on the embedding vector.

The recognizing of the input data may include indicating, among registered users, a user mapped to a registration vector verified to match the embedding vector.

The pooling of the component vectors may include: extracting, from the feature map, a first component vector based on the pooling layer; and extracting, from the feature map, a second component vector having a cosine similarity to the first component vector that is less than a threshold similarity, based on the pooling layer.

The pooling of the component vectors may include extracting, from the feature map, component vectors that are orthogonal to each other.

The generating of the embedding vector may include: calculating an attention weight of the component vectors from the component vectors through an attention layer; and calculating the embedding vector by applying the attention weight to the component vectors.

The generating of the embedding vector may include: calculating an attention weight of the component vectors from the component vectors through an attention layer; generating weighted component vectors by applying the attention weight to each of the component vectors; and calculating the embedding vector by linearly combining the weighted component vectors.

The generating of the embedding vector may include generating normalized component vectors by normalizing the component vectors.

The extracting of the feature map may include extracting a number of feature maps using the feature extraction layer. The feature extraction layer may include a convolutional layer, and the number of feature maps may be proportional to a number of component vectors to be pooled.

In another general aspect, a non-transitory computer-readable storage medium stores instructions that, when executed by a processor, cause the processor to perform the data recognition method described above.

In another general aspect, a training method to train a data recognition model includes: calculating an orthogonal loss for temporary component vectors extracted from a training input based on a feature extraction layer and a pooling layer of the data recognition model; calculating a recognition loss for a temporary embedding vector calculated by recombining the temporary component vectors based on a combination layer of the data recognition model; and training the data recognition model based on the orthogonal loss and the recognition loss.

The calculating of the recognition loss may include calculating a recognition loss between a temporary output recognized from the temporary embedding vector and a training output provided for the training input.

The calculating of the recognition loss may further include calculating the temporary output by propagating the temporary embedding vector from the feature extraction layer to the combination layer via the pooling layer.

The calculating of the recognition loss may include: calculating a temporary attention weight from the temporary component vectors based on an attention layer of the data recognition model; and generating the temporary embedding vector by applying the temporary attention weight to the temporary component vectors.

The generating of the temporary embedding vector may include: calculating weighted component vectors by applying the temporary attention weight to each of the temporary component vectors; and linearly combining the weighted component vectors.

The calculating of the recognition loss may include generating normalized temporary vectors by normalizing the temporary component vectors.

The calculating of the orthogonal loss may include: extracting a temporary feature map from the training input based on the feature extraction layer; extracting the temporary component vectors from the temporary feature map based on the pooling layer; and calculating the orthogonal loss based on an orthogonality between each of the temporary component vectors and another one of the temporary component vectors.

The calculating of the orthogonal loss may include calculating, as the orthogonal loss, a sum of cosine similarities of the temporary component vectors.

The training of the data recognition model may include: calculating a total loss based on the orthogonal loss and the recognition loss; and updating a parameter of the data recognition model to minimize the total loss.

In another general aspect, a data recognition apparatus includes: a memory configured to store a data recognition model including a feature extraction layer, a pooling layer, and a combination layer; and a processor configured to extract a feature map from input data based on the feature extraction layer, pool component vectors from the feature map based on the pooling layer, and generate an embedding vector by recombining the component vectors based on the combination layer.

In another general aspect, a speaker recognition method includes: extracting, based on a feature extraction layer of a speech recognition model, a feature map from speech data input by a speaker; pooling component vectors from the feature map based on a pooling layer of the speech recognition model; generating an embedding vector by recombining the component vectors based on a combination layer of the speech recognition model; recognizing the speaker based on the embedding vector; and indicating a recognition result of the recognizing the speaker.

The indicating of the recognition result may include verifying whether the speaker is a registered user based on a result of comparing the embedding vector to a registration vector corresponding to the registered user.

The indicating of the recognition result may further include: in response to a cosine similarity between the embedding vector and the registration vector exceeding a threshold recognition value, determining verification of the speech data to be successful; and in response to the verification being determined to be successful, unlocking a device.

In another general aspect, a speaker recognition apparatus includes: a memory configured to store a speech recognition model including a feature extraction layer, a pooling layer, and a combination layer; and a processor configured to extract, based on the feature extraction layer, a feature map from speech data input by a speaker, pool component vectors from the feature map based on the pooling layer, generate an embedding vector by recombining the component vectors based on the combination layer, recognize the speaker based on the embedding vector, and indicate a recognition result of the recognizing the speaker.

The recognizing of the speaker based on the embedding vector may include recognizing the speaker based on a similarity between the embedding vector and a registration vector corresponding to a registered user.

The recombining the component vectors based on the combination layer may include generating weighted component vectors by applying an attention weight to the component vectors, and linearly combining the weighted component vectors.

The extracting of the feature map may include extracting convolved data from the speech data based on a convolutional layer of the feature extraction layer, and pooling the convolved data.

In another general aspect, an image recognition apparatus includes: a memory configured to store an image recognition model including a feature extraction layer, a pooling layer, and a combination layer; and a processor configured to extract, based on the feature extraction layer, a feature map from image data obtained from a captured image of user, pool component vectors from the feature map based on the pooling layer, generate an embedding vector by recombining the component vectors based on the combination layer, recognize the user based on the embedding vector, and indicate a recognition result of the recognizing the user.

Other features and aspects will be apparent from the following detailed description, the drawings, and the claims.

Figure 1:
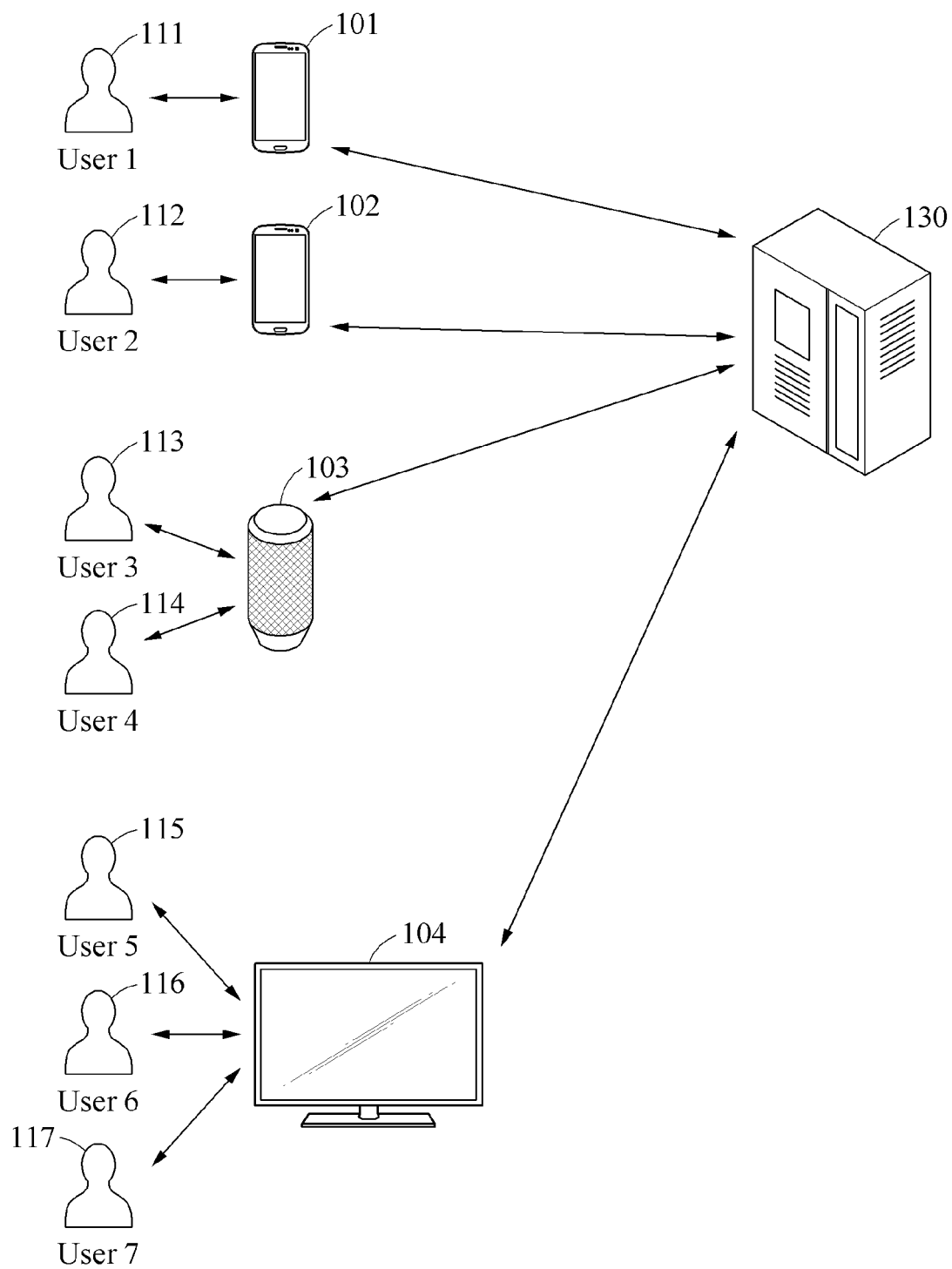
FIG. 1 is a diagram illustrating an example of a data recognition system.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Herein, it is noted that use of the term "may" with respect to an example or embodiment, e.g., as to what an example or embodiment may include or implement, means that at least one example or embodiment exists in which such a feature is included or implemented while all examples and embodiments are not limited thereto.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween. Likewise, similar expressions, for example, "between" and "immediately between," and "adjacent to" and "immediately adjacent to," are also to be construed in the same way. As used herein, the term "and/or" includes any one and any combination of any two or more of the associated listed items.

The terminology used herein is for describing various examples only and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein.

The features of the examples described herein may be combined in various ways as will be apparent after an understanding of the disclosure of this application. Further, although the examples described herein have a variety of configurations, other configurations are possible as will be apparent after an understanding of the disclosure of this application.

Also, in the description of example embodiments, detailed description of structures or functions that are thereby known after an understanding of the disclosure of the present application will be omitted when it is deemed that such description will cause ambiguous interpretation of the example embodiments.

A neural network as described herein may be a single hidden layer neural network (NN) or a deep neural network (DNN). In such examples, the NN or DNN may be one or more of a fully connected network, a convolutional neural network, a recurrent neural network, or bi-directional neural network, or may include different or overlapping neural network portions respectively with such full, convolutional, recurrent, and/or bi-directional connections. The neural network may be configured to perform, as non-limiting examples, speech recognition, translation, agent conversation or interaction, and/or image recognition by respectively mutually mapping input data and output data in nonlinear relationships based on learning, e.g., based on deep learning. Such learning or deep learning is indicative of processor implemented machine learning schemes for solving issues, such as issues related to automated speech recognition, translation, and/or agent conversation or interaction from a big data set, as non-limiting examples. The learning may be implemented by mapping of input data and the output data through supervised or unsupervised learning or training, such that when trained the resultant machine learning model, engine, or example NN may intuitively map further unknown input data to output data with a desired accuracy or reliability.

Also, in differing examples, data may input to the input layer in various forms, and in various dimensional forms, input to respective nodes of the input layer of the neural network. In the neural network, nodes of layers other than the output layer are connected to nodes of a subsequent layer through links for transmitting output signals or information from the current layer to the subsequent layer, for example. The number of the links may correspond to the number of the nodes included in the subsequent layer. For example, in adjacent fully connected layers, each node of a current layer may have a respective link to each node of the subsequent layer, noting that in some examples such full connections may later be pruned or minimized during training or optimization. In a recurrent structure, a node of a layer may be again input to the same node or layer at a subsequent time, while in a bi-directional structure forward and backward connections may be provided. The links are also referred to as connections or connection weights, as referring to the hardware implemented connections or the corresponding 'connection weights' provided by those connections of the neural network. During training and implementation such connections and connection weights may be selectively implemented, removed, and varied to generate or obtain a resultant neural network that is thereby trained and that may be correspondingly implemented for the trained objective, such as for any of the above example recognition objectives.

The architecture, selective connections between neighboring nodes, and corresponding connection weights may be varied during training. The connection weights of the neuro network may be referred to as parameters of the neural network. For example, in a non-limiting supervised training example, the neural network may be trained based on labeled input speech information or image information, or desired corresponding output recognitions or classifications and through backpropagation, as only an example. In the training, connection weightings between nodes of different hidden layers may be recursively adjusted, e.g., through back propagation, until the corresponding neural network model is trained with a desired accuracy rate or below a maximum error rate, for example. The trained neural network may be stored in a memory of any of the training, recognition, translation, and/or agent conversation or interaction apparatuses herein. For example, the trained neural network may be stored in trained vectors, matrix or matrices, or other format, where elements of the matrix represent or suggest the corresponding trained weighted connections (parameters) of the corresponding neural network structure. The stored trained neural network may further include hyper-parameter information, which may define the specific structure or architecture of the corresponding neural network for which the example stored trained parameters correspond to. The hyper-parameters may define how many hidden layers, the function of the layers, such as whether they are recurrent, convolutional, bi-directional, and/or fully connected hidden layers of the neural network structure. In one example, the structure may include convolutional connections. The hyper-parameters may further include information of the configuration and values of any bias and/or contextual nodes in the neural network in differing examples, corresponding activation functions of the nodes, types of nodes, such as long short-term memory nodes in some examples, and define any or any further recurrent or bi-directional structures of the neural network, which may vary in differing embodiments. Here, the example neural network information within the neural network may be information resident at, or represented by, respective layers of the neural network, and/or respective information resident at, or represented by, respective connections within the neural network. In some examples, a layer or a series of layers may output or generate one or more extracted feature information of information provided to the layer and dependent on the respective connection weights and types of connections of the layer(s). In this example, the input of each of the layers may be one, two, three, or more dimensional information, such as a multi-dimensional vector, just as the hidden layer(s) respective neural network information and the output of the neural network may also be single or multi-dimensional information dependent on the set parameters and architecture of the neural network. The output of the neural network may also be probabilistic information.

FIG. 1 is a diagram illustrating an example of a data recognition system.

A data recognition system described herein is a system configured to recognize data input from a user. In a case in which the data recognition system recognizes speech data, the data recognition system may be referred to as a speech recognition system. In a case in which the data recognition system recognizes image data, the data recognition system may be referred to as an image recognition system. Although a speech recognition system will be mainly described hereinafter, the data recognition system is not limited to a speech recognition system.

Referring to FIG. 1, the speech recognition system includes a speech recognition apparatus and a speech recognition server 130.

The speech recognition apparatus described herein may be configured to collect sound or voice and obtain an audio signal, which is a digital electrical signal, from the collected sound or voice. For example, the speech recognition apparatus may collect speech sound of a human being as nearby sound, and distinguish a voice or speech of a user of the speech recognition apparatus from the nearby sound. In addition, the speech recognition apparatus may recognize a registered user from a speech signal.

In this specification, the term "recognition" is used as a concept including verification and identification. The verification may be an operation of determining whether input data is true or false. For example, the verification may be an operation of determining whether a user indicated by input data is a registered user or not. The identification may be an operation of determining a label indicated by input data among a plurality of labels. For example, each of the labels may indicate an identity (ID) of each registered user.

For example, the speech recognition apparatus may be an electronic device possessed by an individual user. In this example, the speech recognition apparatus may include, for example, a terminal 101. In the case of the speech recognition apparatus including the terminal 101, the speech recognition apparatus may include, for example, a smartphone, a smart pad, a wearable device such as a smart band, a personal digital assistant (PDA), a laptop, or the like.

For another example, the speech recognition apparatus may also be an electronic device shared by a plurality of users. In this example, the speech recognition apparatus may include, for example, a speech recognition speaker 103 shared by users 113 and 114 or a speech recognition television (TV) 104 shared by users 115, 116, and 117, as illustrated in FIG. 1.

The speech recognition system may recognize a voice of a user. The speech recognition may include an operation of distinguishing a voice of a user included in an audio signal, an operation of recognizing the user based on the voice, an operation of converting the voice to a speech expressed in a language, and an operation of converting the speech to a text.

The speech recognition server 130 may recognize a speech signal and identify a user. In addition, the speech recognition server 130 may generate text data corresponding to the speech signal. The speech recognition server 130 may receive the speech signal of the user from the speech recognition apparatus, and generate the text data corresponding to the speech signal based on the received speech signal. The speech recognition server 130 may transmit, to the speech recognition apparatus, the text data generated by converting the speech signal. The text data generated by the speech recognition server 130 may be used for various services to be provided to the user of the speech recognition apparatus.

In the example illustrated in FIG. 1, the first terminal 101 is an individualized electronic device of a first user 111, and a second terminal 102 is an individualized electronic device of a second user 112. In this example, the first terminal 101 may collect, from the first user 111, a speech signal indicating an instruction to make a call (e.g., an audio call or an audio/video call) to the second terminal 102 of the second user 112. The speech recognition server 130 may then receive, from the first terminal 101, the speech signal indicating the instruction of the first user 111. The speech recognition server 130 may obtain text data corresponding to the instruction from the speech signal. The speech recognition server 130 may transmit the obtained text data to the first terminal 101. When the first terminal 101 receives the text data recognized from the instruction spoken by the first user 111, the first terminal 101 may execute a call application and control the call application to make a call to the second user 112.

In another example, the speech recognition apparatus may use the text data recognized by the speech recognition server 130 to generate a schedule for a user of the speech recognition apparatus, retrieve data of a web service, send a text message, or provide a service of retrieving data stored in the speech recognition apparatus.

However, operations of the speech recognition apparatus and the speech recognition server 130 are not limited to the operations described in the foregoing description. For example, the speech recognition apparatus may collect a speech signal, and autonomously recognize a user from the speech signal.

In this disclosure, speech-based user recognition will be mainly described as an example of data recognition. Hereinafter, a speech recognition model used in the speech recognition system will be described in detail with reference to FIG. 2.

Figure 2:
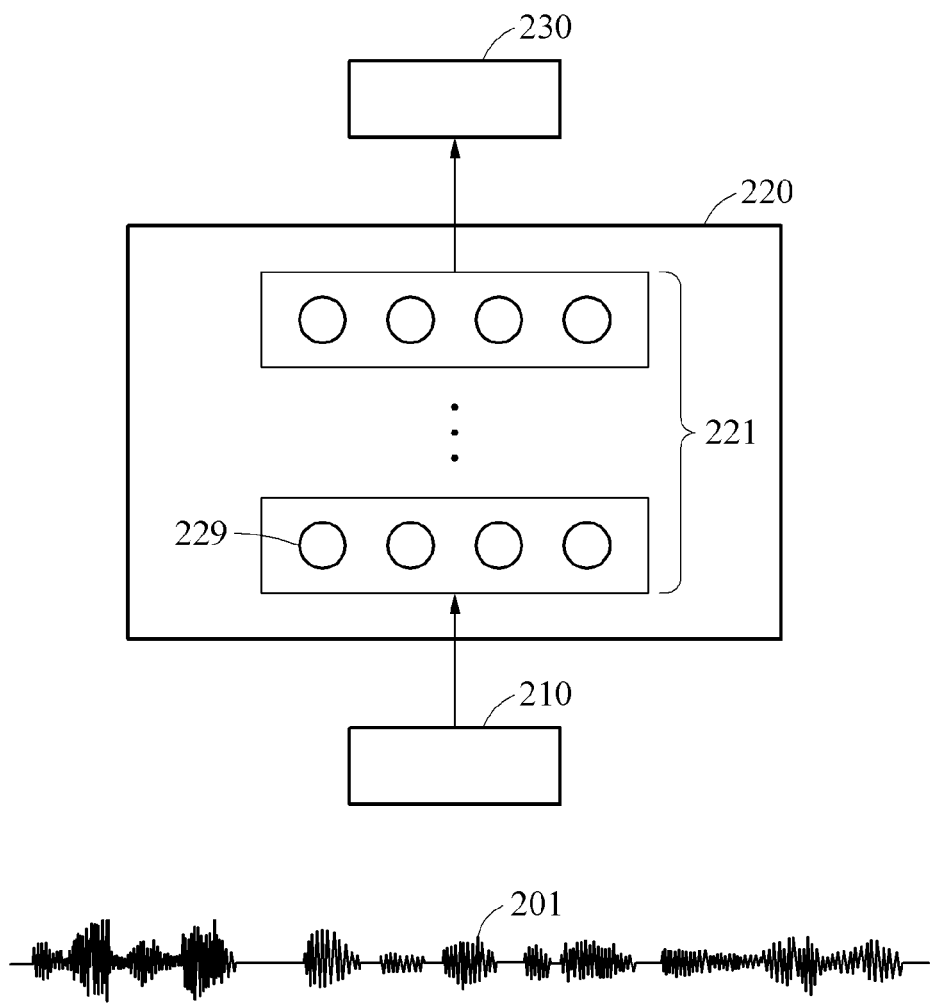
FIG. 2 is a diagram illustrating an example of a speech recognition model.

FIG. 2 is a diagram illustrating an example of a speech recognition model.

Referring to FIG. 2, the speech recognition system described above with reference to FIG. 1 may use a speech recognition model 220. The speech recognition model 220 may be configured to recognize a user from a speech signal 201. A speech recognition server may store the speech recognition model 220, and the speech recognition server may recognize the user from the speech signal based on the speech recognition model 220. For example, a speech recognition apparatus may transmit, to the speech recognition server, information including the speech signal 201 or speech feature data obtained through conversion from the speech signal 201, and the speech recognition server may perform speech-based user recognition using the information transmitted by the speech recognition apparatus. However, the disclosure is not limited to the foregoing example, and thus the speech recognition apparatus may autonomously store the speech recognition model 220 and recognize the user using the stored speech recognition model 220.

In an example, the speech recognition model 220 may be embodied by various architectures, such as, for example, a Gaussian mixture model (GMM), a deep neural network (DNN), and a bidirectional long short-term memory (BL-STM). However, the speech recognition model 220 is not limited to an example embodied by an architecture for machine learning, and may thus be embodied by a combined architecture of at least one of the examples. For example, a neural network may be a recognition model embodied by hardware or a combination of hardware and software to perform a complex calculation using numerous artificial nodes. The neural network may perform recognition or learning (or training) through these artificial nodes.

In an example, the neural network may include a plurality of layers. For example, as illustrated in FIG. 2, the neural network includes an input layer 210, at least one hidden layer 221, and an output layer 230. The input layer 210 receives input data and transmits the received input data to the hidden layer 221, and the output layer 230 generates output data based on a signal received from nodes of the hidden layer 221.

The hidden layer 221 is connected to the input layer and the output layer by being provided therebetween, and the speech recognition system transforms the input data into a predictable value through the hidden layer 221. Nodes included in the input layer and the hidden layer 221 are connected to each other through connection lines having a connection weight, and nodes included in the hidden layer 221 and the output layer are also connected to each other through connection lines having a connection weight. Among the nodes of the neural network, a node included in the hidden layer 221 is referred to as a hidden node 229.

A type of neural network including a plurality of hidden layers is referred to as a DNN, and learning or training the DNN is referred to as deep learning. The DNN may correspond to a convolutional neural network (CNN), a recurrent neural network (RNN), a deep belief network, a fully connected network, a bi-directional neural network, a restricted Boltzman machine, or may include different or overlapping neural network portions respectively with full, convolutional, recurrent, and/or bi-directional connections.

The input layer, the hidden layer 221, and the output layer include a plurality of nodes. The hidden layer 221 may be a convolution filter or a fully-connected layer in a CNN, or a filter or layer of various types grouped by a certain function or characteristic.

For example, the speech recognition apparatus or the speech recognition server may input outputs of previous hidden nodes included in a previous hidden layer to each hidden layer 221 through connection lines having a connection weight, and generate an output of the hidden node 229 included in the hidden layer 221 based on an activation function and values to which the connection weight is applied to the outputs of the previous hidden nodes. In an example, to fire an output to a next hidden node, a result of the activation function may need to exceed a threshold value of a current hidden node. In this example, a node may remain inactivated without firing a signal to a next node until a threshold strength of activation is reached through input vectors.

The output layer may output an embedding vector. The embedding vector may be an abstract vector of a speech characteristic or feature of a speaker. The embedding vector may be used for user recognition.

Application of speech-based user recognition is described as an example of data recognition with reference to FIGS. 1 and 2. Hereinafter, an operation of recognizing data and an operation of training a data recognition model will be described in detail with reference to FIGS. 3 through 12.

Figure 3:
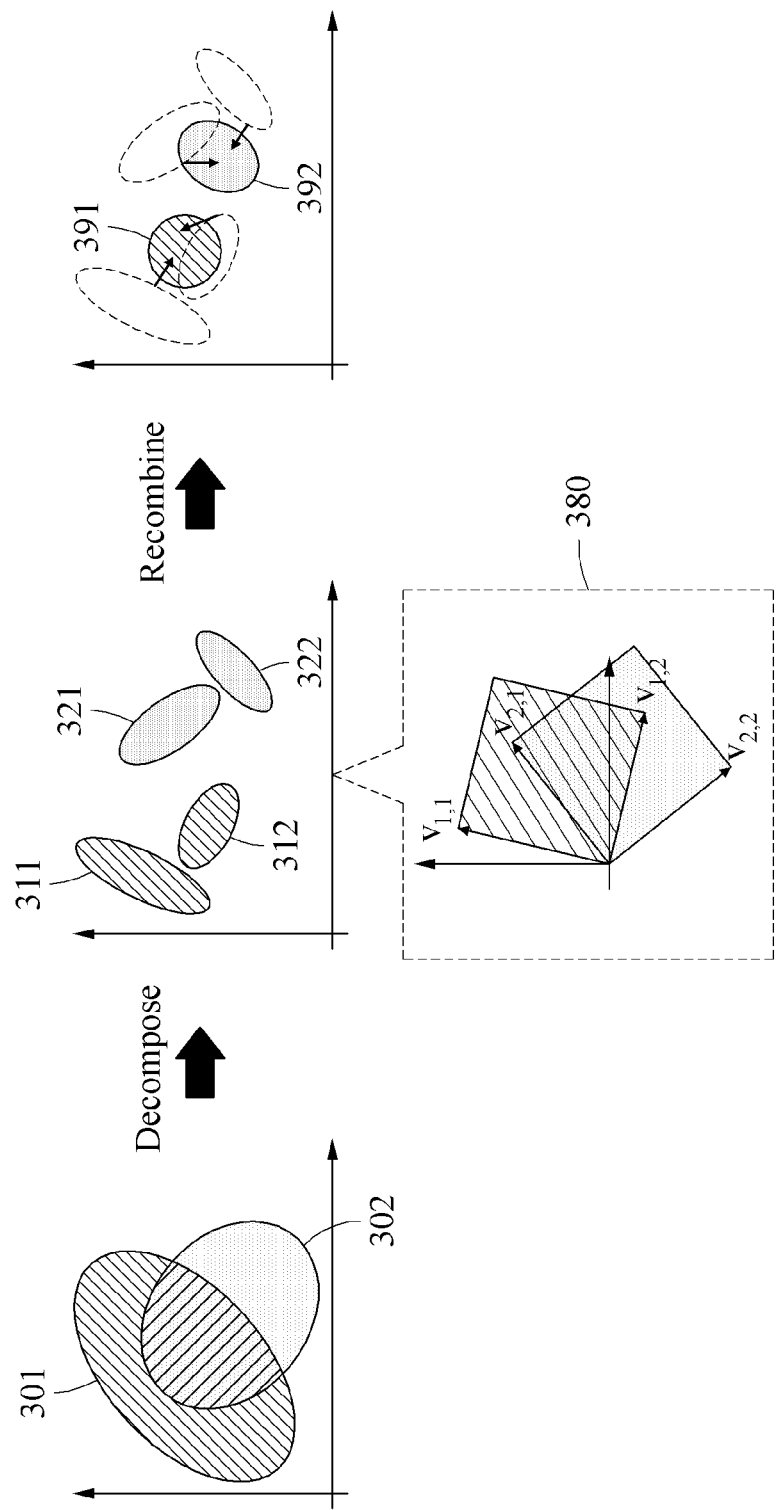
FIG. 3 is a diagram illustrating an example of a change in vector distribution.

FIG. 3 is a diagram illustrating an example of a change in vector distribution.

Referring to FIG. 3, a data recognition model may be configured to output similar embedding vectors for input data obtained from a user with a same identity. In addition, the data recognition model may be configured to output different embedding vectors for input data obtained from a user with a different identity. For example, the data recognition model may be configured to eliminate unnecessary information from input data obtained from a user, and generate a discriminative embedding vector. The data recognition model using speech data as an input is referred to as a speech recognition model.

For example, when a first vector $v_1$ and a second vector $v_2$ are extracted from first input data $x_1$ and second input data $x_2$, respectively, through a convolutional neural network (CNN), a first vector distribution 301 and a second vector distribution 302 may be obtained as illustrated in FIG. 3.

In an example, a data recognition apparatus may extract a plurality of component vectors from each set of input data through a pooling layer of the data recognition model. For example, the data recognition apparatus may pool the component vectors such that each of the component vectors is orthogonal to or coarsely orthogonal to another one of the component vectors. Thus, the data recognition apparatus may decompose an input vector into the component vectors by pooling the component vectors from the input data through the pooling layer. In the example illustrated in FIG. 3, the data recognition apparatus decomposes the first vector $v_1$ into two first component vectors $v_{1,1}$ and $v_{1,2}$. The data recognition apparatus decomposes the second vector $v_2$ into two second component vectors $v_{2,1}$ and $v_{2,2}$. In this example, a distribution 311 corresponding to the first component vector $v_{1,1}$, a distribution 312 corresponding to the first component vector $v_{1,2}$, a distribution 321 corresponding to the second component vector $v_{2,1}$, and a distribution 322 corresponding to the second component vector $v_{2,2}$ may be obtained as illustrated in FIG. 3.

A subspace of the first input data $x_1$ is expanded or spanned by the first component vectors $v_{1,1}$ and $v_{1,2}$. A subspace of the second input data $x_2$ is spanned by the second component vectors $v_{2,1}$ and $v_{2,2}$. As illustrated in vector coordinates 380, when the first component vectors $v_{1,1}$ and $v_{1,2}$ are orthogonal to each other, the subspace of the first input data $x_1$ may be spanned further. Similarly, when the second component vectors $v_{2,1}$ and $v_{2,2}$ are orthogonal to each other, the second input data $x_2$ may also be spanned further. For example, Equation 1 represents a size of an area to be expanded, or spanned as described herein, by component vectors $v_{i,1}$ and $v_{i,2}$ of ith input data $x_i$.

$$|v_{i,1}||v_{i,2}|\sin\theta \quad\quad \text{[Equation 1]}$$

In Equation 1, θ is an angle formed between the component vectors $v_{i,1}$ and $v_{i,2}$. When the component vectors $v_{i,1}$ and $v_{i,2}$ are orthogonal to each other, θ is 90° and a subspace of the input data $x_i$ is maximized.

Thus, when component vectors corresponding to each set of input data are orthogonal to each other, an area in which a subspace corresponding to a set of the input data overlaps a subspace corresponding to another set of the input data may be maximized. When such an overlapping area is larger, it is more likely that the data recognition apparatus generates similar embedding vectors for a same speaker based on a weighted sum of the component vectors. In addition, as illustrated in FIG. 3, the data recognition apparatus may recombine component vectors such that embedding vectors corresponding to input data obtained from different speakers are distinguishable from each other.

The data recognition apparatus may generate an embedding vector having similar distributions for a same speaker, yet distinguishable for different speakers, for example, the distributions 391 and 392, by recombining orthogonal component vectors. The embedding vector generated as described in the foregoing may be robust against a global variation.

A component vector illustrated in FIG. 3 may be construed as a two-dimensional (2D) geometric vector for convenience of description. However, a dimension of the component vector is not limited to two dimensions, and thus the component vector may be an m-dimension vector, in which m is an integer greater than or equal to 1.

Figure 4:
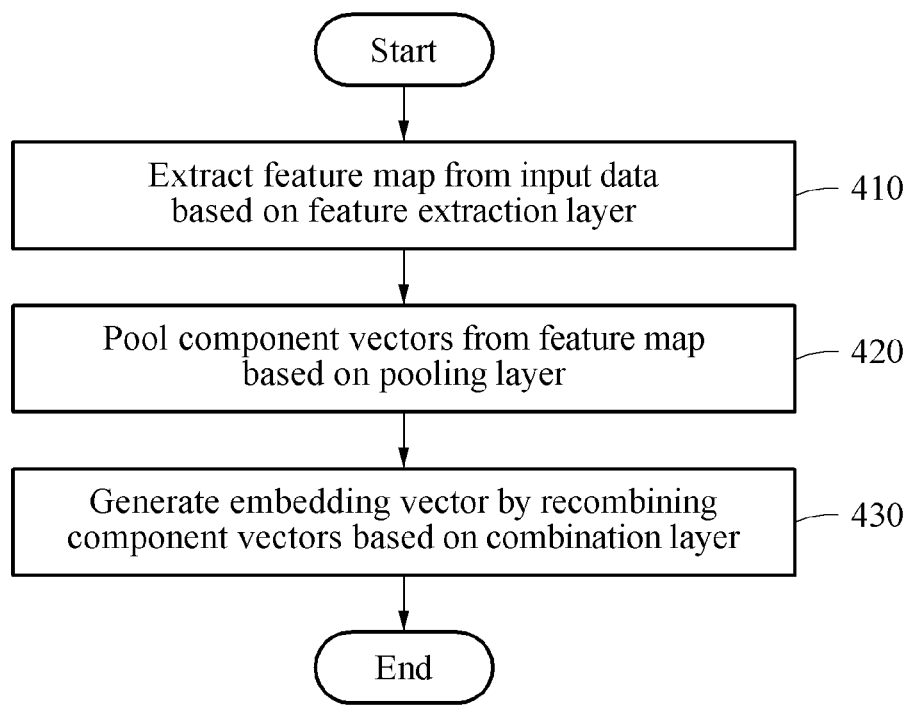
FIG. 4 is a flowchart illustrating an example of a data recognition method.

FIG. 4 is a flowchart illustrating an example of a data recognition method.

Referring to FIG. 4, in operation 410, a data recognition apparatus extracts a feature map from input data based on a feature extraction layer of a data recognition model. The feature extraction layer may include, for example, a convolutional layer. The feature map may be a map in which the input data is abstracted by the convolutional layer. The extraction of the feature map will be described in detail with reference to FIG. 6.

In operation 420, the data recognition apparatus pools component vectors from the feature map based on a pooling layer of the data recognition model. The pooling layer may be configured to pool component vectors from a feature map, and the data recognition apparatus may, for example, extract component vectors orthogonal to each other or coarsely orthogonal to each other using the pooling layer. A component vector refers to a vector decomposed from a feature map. The pooling of the component vectors will be described in detail with reference to FIG. 7.

In operation 430, the data recognition apparatus generates an embedding vector by recombining the component vectors based on a combination layer of the data recognition model. The combination layer may be configured to linearly combine component vectors. The embedding vector refers to a vector in which the component vectors are recombined and may be, for example, a sum of component vectors to which a weight is applied. The embedding vector may be used to recognize a user inputting the input data. The recombination of the component vectors will be described in detail with reference to FIG. 7.

Figure 5:
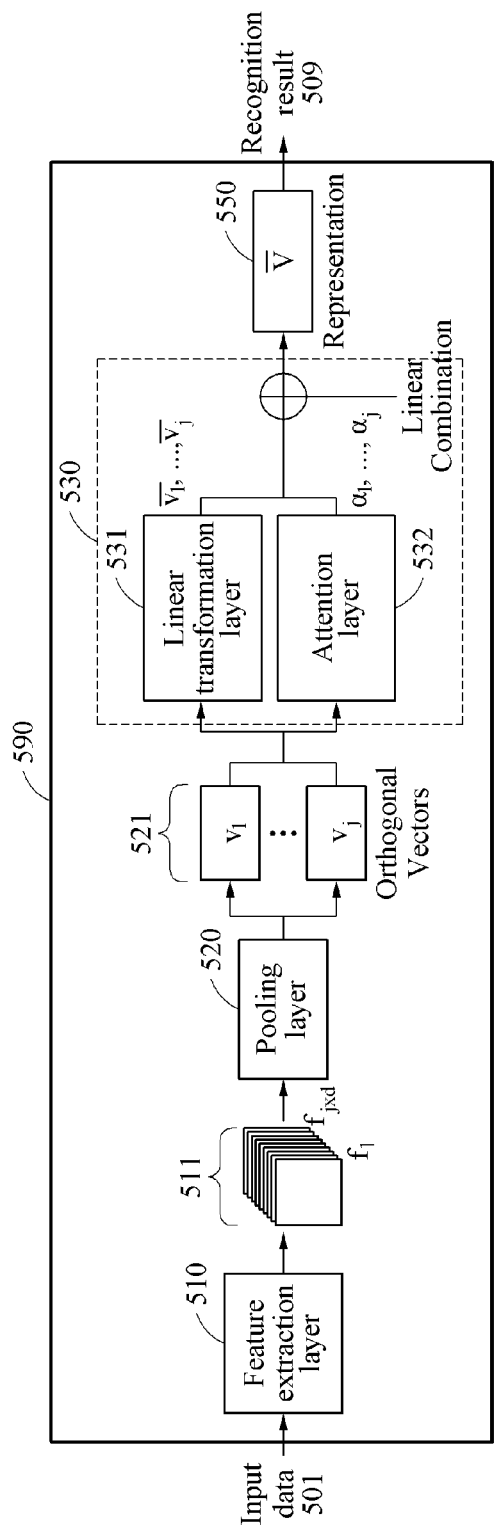
FIG. 5 is a diagram illustrating an example of a data recognition model.

FIG. 5 is a diagram illustrating an example of a data recognition model.

Referring to FIG. 5, a data recognition apparatus calculates a recognition result 509 from input data 501 based on a data recognition model 590. The recognition result 509 may be, for example, a result of recognizing a user corresponding to the input data 501. For example, in a case of the input data 501 being image data, the data recognition apparatus may recognize a user whose image is captured in the image data. For another example, in a case of the input data 501 being speech data, the data recognition apparatus may recognize a user who utters a speech included in the speech data. However, an output of the data recognition model 590 is not limited to the foregoing examples, and may vary based on a design.

In the example illustrated in FIG. 5, the data recognition model 590 includes a feature extraction layer 510, a pooling layer 520, and a combination layer 530. The combination layer 530 includes a linear transformation layer 531 and an attention layer 532. The feature extraction layer 510 is a layer configured to extract a feature map 511 from the input data 501. The pooling layer 520 is a layer configured to pool component vectors 521 from the feature map 511. The combination layer 530 is a layer configured to linearly combine component vectors. The linear transformation layer 531 is a layer configured to linearly transform component vectors. The attention layer 532 is a layer configured to calculate an attention weight for the linear combination of the component vectors. A parameter of the data recognition model 590 may be, for example, a connection weight between nodes. The parameter of the data recognition model 590 may be trained in advance.

The data recognition apparatus propagates the input data 501 from an input layer up to an output layer of the data recognition model 590. The data recognition apparatus generates the recognition result 509 from an embedding vector 550 generated based on the data recognition model 590.

In an example, the data recognition apparatus may identify a label corresponding to the embedding vector 550 through a classifier. For example, the data recognition apparatus may calculate a probability of the input data 501 corresponding to each of users using the embedding vector 550. The data recognition apparatus may identify a user with a greatest probability from among the users as a user corresponding to the input data 501. In this example, the recognition result 509 may indicate the probability of the input data 501 corresponding to each of the users, a label of the user corresponding to the greatest probability, and the like.

In another example, the data recognition apparatus may generate a target embedding vector 550 from the input data 501, hereinafter also referred to as target data, which is a target to be verified, based on the data recognition model 590. The data recognition apparatus may retrieve a vector matching the target embedding vector 550 from reference embedding vectors 550 prestored in a device, for example, a mobile terminal such as a smartphone. The data recognition apparatus may verify whether the target embedding vector 550 and each of the reference embedding vectors 550 are equal or similar to each other. For example, the data recognition apparatus may calculate a similarity, for example, a cosine similarity, between the target embedding vector 550 and each of the reference embedding vectors 550. In this example, in response to the calculated similarity exceeding a threshold recognition value, the data recognition apparatus may determine that the two embedding vectors 550 are equal or similar to each other.

In response to the calculated similarity exceeding the threshold recognition value, the data recognition apparatus may determine a verification of the target data to be successful. Conversely, in response to the calculated similarity being less than or equal to the threshold recognition value, the data recognition apparatus may determine the verification of the target data to be unsuccessful. The reference embedding vectors 550 may be stored in a device or an apparatus in which the data recognition apparatus is provided, before the target data is input to the data recognition apparatus.

The data recognition apparatus may indicate a result of recognizing a speaker of the target data based on the target embedding vector 550. For example, in response to a determination that the verification is successful, the data recognition apparatus may unlock the device. The unlocking may indicate, for example, an operation of allowing an access to at least one application in the device. The data recognition apparatus may allow an access to each application in the device based on an access right set for a registered user before the verification is performed. The device may execute an application to which an access is allowed for the registered user, in response to an input from the user.

Hereinafter, an operation to be performed using each layer of the data recognition model 590 will be described in detail.

Figure 6:
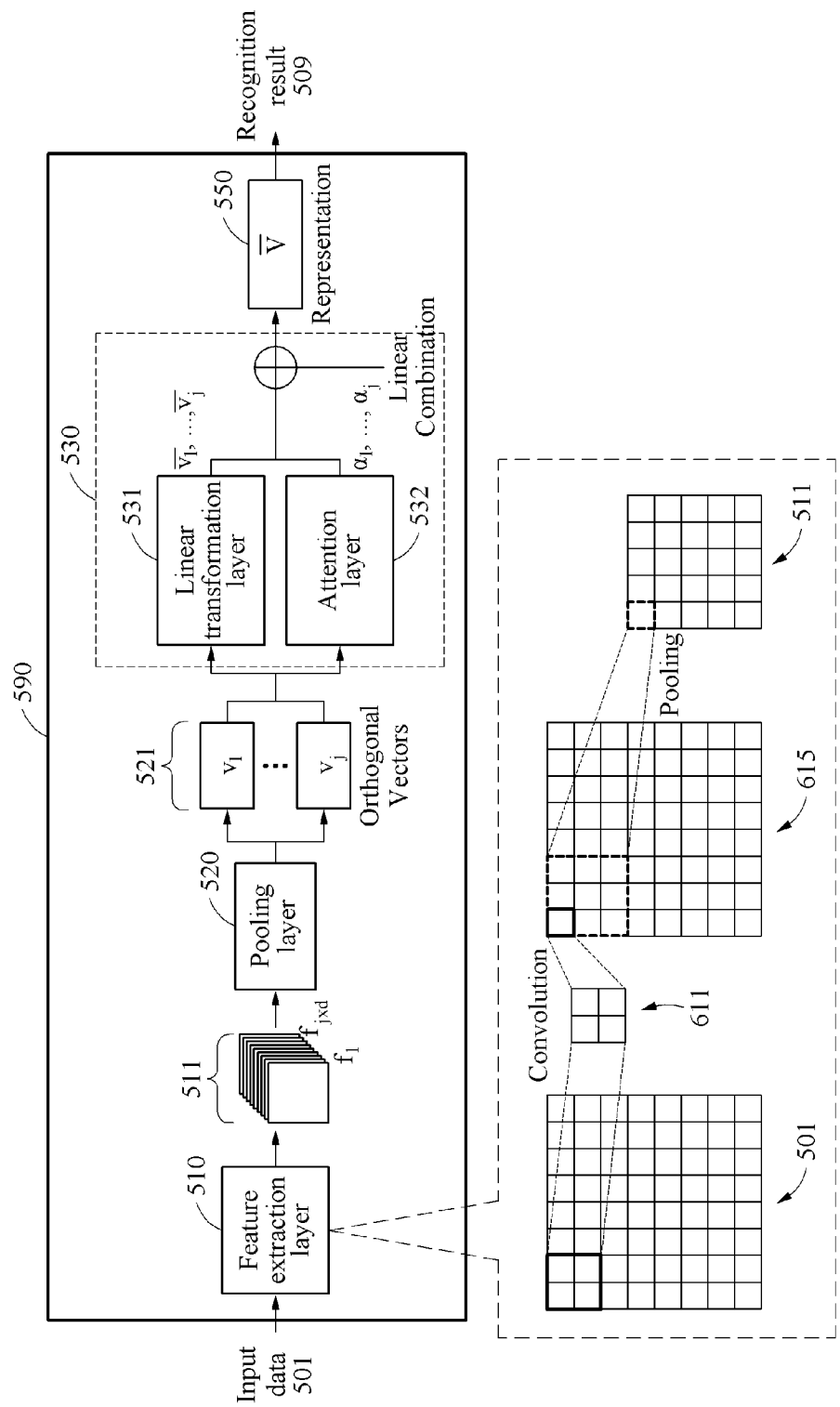
FIG. 6 is a diagram illustrating an example of extraction of a feature map in a data recognition model.

FIG. 6 is a diagram illustrating an example of extraction of a feature map in a data recognition model.

Referring to FIG. 6, a feature extraction layer 510 includes a convolutional layer. In addition, the feature extraction layer 510 may include an additional layer. In the example illustrated in FIG. 6, the additional layer may pool a convolved result.

In the example, a data recognition apparatus extracts convolved data 615 from input data 501 based on the convolutional layer. The data recognition apparatus calculates the convolved data 615 by performing a convolution operation with a stride on a kernel 611 with respect to the input data 501. In addition, the data recognition apparatus extracts a feature map 511 by pooling the convolved data 615.

In an example, the data recognition apparatus may extract a number of feature maps 511 using the feature extraction layer 510 including the convolutional layer. In this example, the number of the feature maps 511 to be extracted is proportional to a number of component vectors 521 to be pooled. For example, in a case in which j component vectors 521 are to be pooled, the data recognition apparatus may extract d feature maps 511 for each component vector. Thus, the data recognition apparatus may extract a total of j×d feature maps, in which j denotes an integer greater than or equal to 2, and d denotes an integer greater than or equal to 1.

Figure 7:
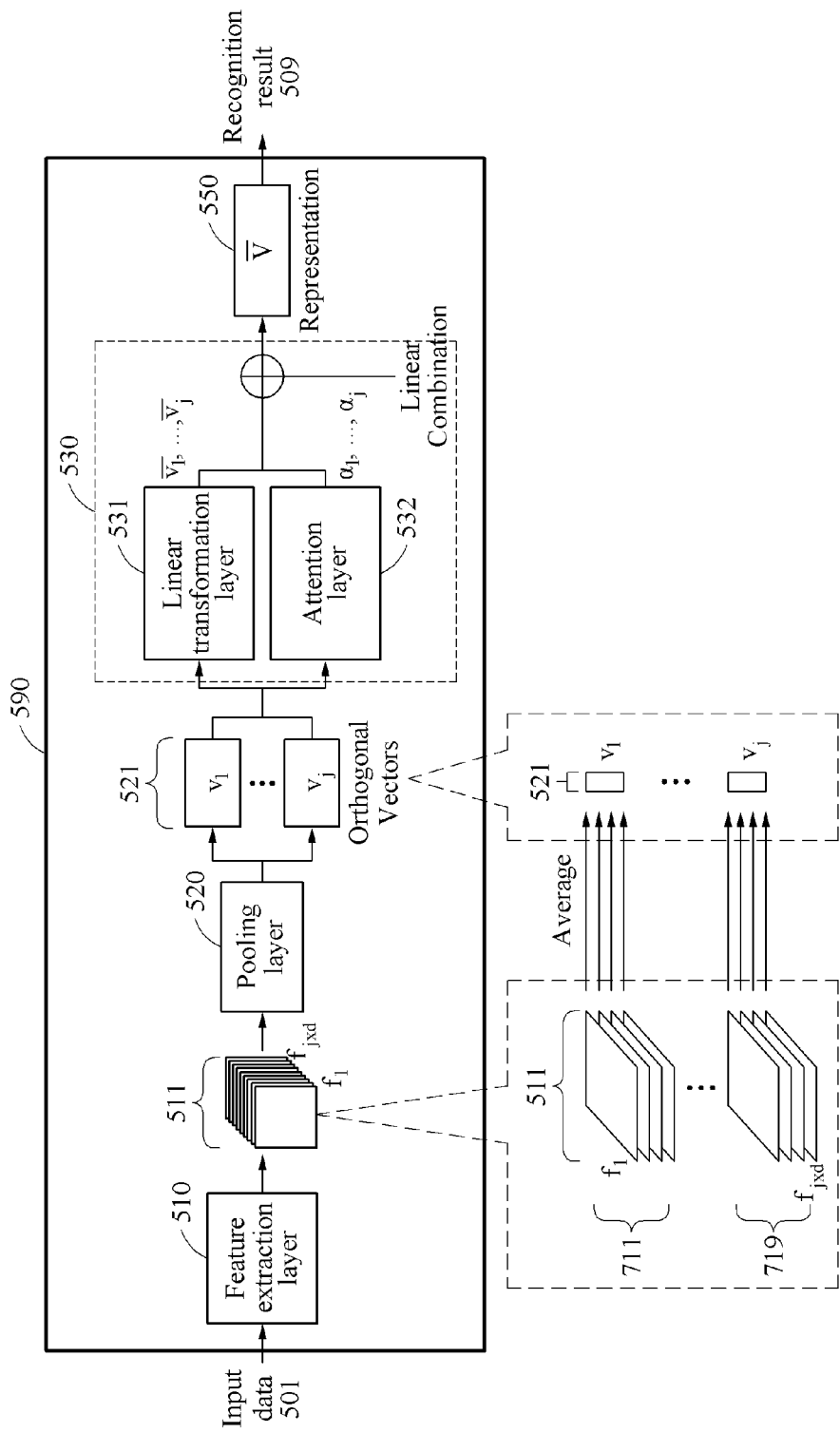
FIG. 7 is a diagram illustrating an example of pooling and recombination of component vectors in a data recognition model.

FIG. 7 is a diagram illustrating an example of pooling and recombination of component vectors in a data recognition model.

Referring to FIG. 7, a data recognition apparatus extracts a plurality of component vectors 521 from a feature map based on a pooling layer 520. For example, as illustrated, the data recognition apparatus extracts component vectors 521 orthogonal to each other from the feature map. The pooling layer 520 may include a parameter trained such that component vectors 521 with a cosine similarity therebetween being minimized are output from the feature map.

The data recognition apparatus pools a component vector from a corresponding feature map 511 among a plurality of feature maps 511. For example, as illustrated, the data recognition apparatus extracts a first component vector $v_1$ from a first feature map 711 among the feature maps 511 based on the pooling layer 520. The data recognition apparatus extracts a second component vector $v_j$ with a cosine similarity to the first component vector $v_1$ being less than a threshold similarity, from a second feature map 719 among the feature maps 511 based on the pooling layer 520. The data recognition apparatus pools j component vectors 521 from j×d feature maps 511. In the example illustrated in FIG. 5, corresponding feature maps, for example, $f_i$ through $f_{i \times d}$, may be used to pool each component vector $v_i$, in which i denotes an integer of 1 or greater and j or less.

The data recognition apparatus generates an embedding vector 550 by combining the component vectors 521 based on a combination layer 530. For example, as illustrated, the combination layer 530 includes a linear transformation layer 531. The data recognition apparatus transforms the component vectors 521 based on the linear transformation layer 531 to transform a vector into a format suitable for linear combination. In addition, the data recognition apparatus normalizes the component vectors 521 to generate normalized component vectors. Through such normalization, the data recognition apparatus may restrict an influence of a size while maintaining a directivity or orientation of a vector transformed from a component vector. The linear transformation layer 531 and the normalization may be represented by Equation 2.

$$\overline{v_1} = \frac{f(v_1)}{\|f(v_1)\|},$$
$$\overline{v_2} = \frac{f(v_2)}{\|f(v_2)\|}$$

[Equation 2]

In Equation 2, only a first component vector $v_1$ and a second component vector $v_2$ will be described for convenience of description. In Equation 2, f( ) is a linear transformation function for each component vector. $\overline{v}_1$ and $\overline{v}_2$ are a normalized first component vector and a normalized second component vector, respectively. A size of a normalized component vector may be between 0 and 1.

The data recognition apparatus determines a size of each normalized component vector through an attention layer 532. For example, the data recognition apparatus calculates an attention weight of the component vectors 521 from the component vectors 521 through the attention layer 532 as represented by Equation 3.

$$\alpha_1 = f_a(v_1), \alpha_2 = f_a(v_2)$$

[Equation 3]

In Equation 3, only an attention weight of a first component vector $v_1$ and an attention weight of a second component vector $v_2$ will be described for convenience of description. In Equation 3, $f_a$( ) is a mathematically modeled function of the attention layer 532. $\alpha_1$ and $\alpha_2$ are a first attention weight of the first component vector $v_1$ and a second attention weight of the second component vector $v_2$, respectively.

The data recognition apparatus calculates the embedding vector 550 by applying the attention weight to each of the component vectors 521. For example, the data recognition apparatus generates weighted component vectors 521 by applying the attention weight to each of the component vectors 521. The data recognition apparatus calculates the embedding vector 550 by linearly combining the weighted component vectors 521. The embedding vector 550 may be represented by Equation 4.

$$\bar{v} = \alpha_1 \bar{v}_1 + \alpha_2 \bar{v}_2 \quad \text{[Equation 4]}$$

In Equation 4, only a linear combination of a normalized first component vector $\bar{v}_1$ and a normalized second component vector $\bar{v}_2$ will be described for convenience of description. In Equation 4, $\bar{v}$ is the embedding vector 550 in which the weighted component vectors 521 are linearly combined.

The combination layer 530 including the linear transformation layer 531 and the attention layer 532 may include a parameter trained such that the orthogonal component vectors 521 are recombined to be optimally combined. Thus, the data recognition apparatus may form a similar subspace for a same user and different subspaces for different users by combining the component vectors 521 through the combination layer 530.

Figure 8:
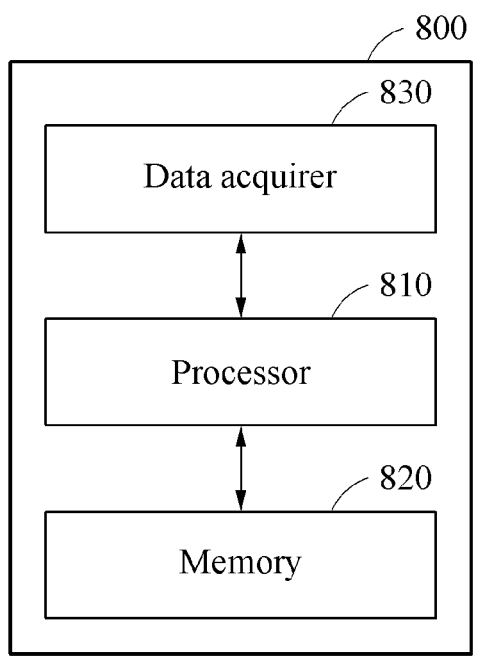
FIG. 8 is a diagram illustrating an example of a data recognition apparatus.

FIG. 8 is a diagram illustrating an example of a data recognition apparatus.

Referring to FIG. 8, a data recognition apparatus 800 includes a processor 810, a memory 820, and a data acquirer 830.

The processor 810 may extract a feature map from input data based on a feature extraction layer. The processor 810 may pool component vectors from the feature map based on a pooling layer. The processor 810 may generate an embedding vector by recombining the component vectors based on a combination layer. The processor may recognize the input data based on the embedding vector. The processor 810 may verify whether a speaker is a registered user based on a result of comparing the embedding vector and a registration vector. For example, the processor 810 may indicate a user to which the registration vector verified to match the embedding vector is mapped among registered users. A registration vector may indicate a vector that is stored in the memory 820 and corresponds to a registered user. Operations of the processor 810 are not limited to the foregoing operations, and the processor 810 may perform one or more operations described above with reference to FIGS. 1 through 7.

The memory 820 may store a data recognition model including the feature extraction layer, the pooling layer, and the combination layer. The memory 820 may store, temporarily or permanently, data needed to perform the data recognition method described herein.

The data acquirer 830 may obtain the input data. For example, the data acquirer 830 may include a camera sensor, and the camera sensor may capture an image including at least a portion of a body of a user by a single frame or a plurality of frames. The portion of the body may include, for example, a face, an eye, an iris, and a fingerprint, and the like of the user. However, the portion of the body is not limited to the foregoing examples, and may vary based on a design. For another example, the data acquirer 830 may include a voice sensor, and the voice sensor may capture a speech signal of a user and generate speech data from the captured speech signal.

The processor 810 may perform a speech-based speaker identifying operation, a speech-based user verifying operation, a speech-based payment operation, a speech-based wake-up operation, and the like, based on the embedding vector. The speech recognition apparatus 800 may also perform other verification operations by generating an embedding vector as described above for other types of data which differ from the speech data.

The data recognition apparatus 800 may be a mobile device, for example, a smartphone. However, the data recognition apparatus 800 is not limited to such a mobile device. The data recognition apparatus 800 may also be an automated teller machine (ATM), a vehicle, a security system (e.g., access control gate), and the like.

Figure 9:
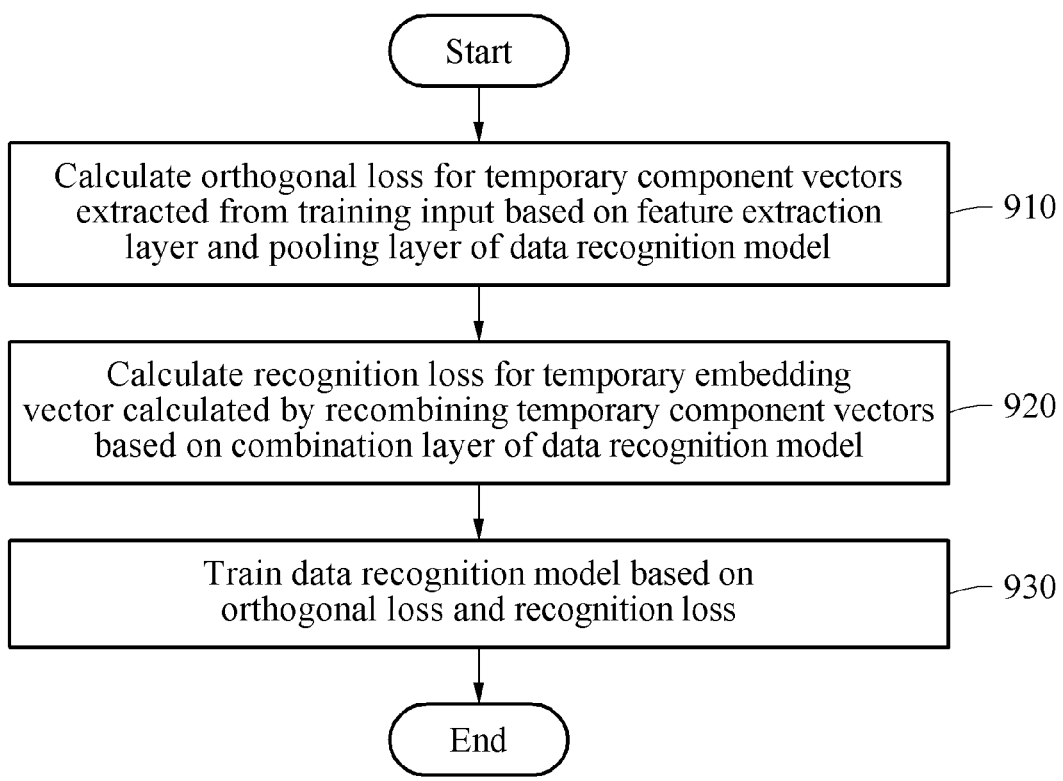
FIG. 9 is a flowchart illustrating an example of a training method to train a data recognition model.

FIG. 9 is a flowchart illustrating an example of a training method to train a data recognition model.

A training method to train a data recognition model, hereinafter simply referred to as a training method, may be performed by a training apparatus. The training apparatus may train the data recognition model using training data. The data recognition model for which training is not yet completed is referred to as a temporary model herein. The training data may include a pair of a training input and a training output corresponding to the training input. The training output may be, for example, a user label provided for the training input.

Referring to FIG. 9, in operation 910, the training apparatus calculates an orthogonal loss for temporary component vectors extracted from the training input based on a feature extraction layer and a pooling layer of the data recognition model. For example, the training apparatus may extract the temporary component vectors by propagating forwards the training input to the feature extraction layer and the pooling layer. A temporary component vector may indicate a vector extracted based on the feature extraction layer and the pooling layer before the training is completed. The orthogonal loss will be described hereinafter in detail with reference to FIG. 10.

In operation 920, the training apparatus calculates a recognition loss for a temporary embedding vector calculated by recombining the temporary component vectors based on a combination layer of the data recognition model. The temporary embedding vector may indicate a vector in which the temporary component vectors are recombined by the combination layer before the training is completed. The recognition loss will be described hereinafter in detail with reference to FIG. 10.

In operation 930, the training apparatus trains the data recognition model based on the orthogonal loss and the recognition loss. For example, the training apparatus may calculate a total loss from a sum of the orthogonal loss and the recognition loss. The training apparatus may update a parameter of the data recognition model such that the total loss is minimized.

Figure 10:
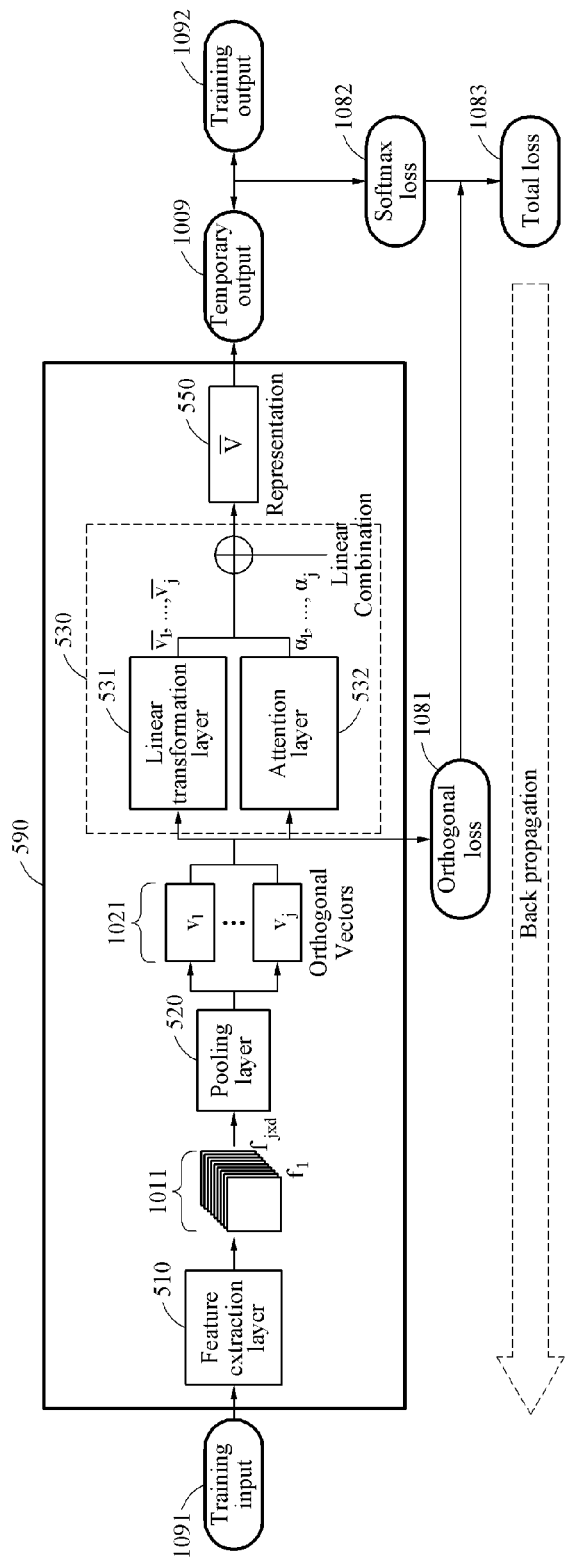
FIG. 10 is a diagram illustrating an example of training of a data recognition model.

FIG. 10 is a diagram illustrating an example of training of a data recognition model.

Referring to FIG. 10, a training apparatus extracts a temporary feature map 1011 from a training input 1091 based on a feature extraction layer 510. The training apparatus extracts a plurality of temporary component vectors 1021 from the temporary feature map 1011 based on a pooling layer 520. The training apparatus calculates an orthogonal loss 1081 based on an orthogonality, for example, an orthogonal level, between each of the temporary component vectors 1021 and another one of the temporary component vectors 1021. For example, the training apparatus may calculate, as the orthogonal loss 1081, a sum of cosine similarities of the temporary component vectors 1021 as represented by Equation 5.

$$L_{orthogonal} = \sum_{k} \sum_{l, l \neq k} \left| \frac{v_k^t \cdot v_l}{\|v_k\| \cdot \|v_l\|} \right| \quad \text{[Equation 5]}$$

In Equation 5, $v_k$ and $v_l$ are a kth component vector and a lth component vector, respectively, in which k and l are each an integer of 1 or greater and j or less. As described above, the training apparatus calculates, as the orthogonal loss 1081, a sum of the cosine similarities of the temporary component vectors 1021. When a parameter of a data recognition model 590 is updated such that the orthogonal loss 1081 is minimized, component vectors may be orthogonal to each other or coarsely orthogonal to each other. In Equation 5, t is a transposition of a vector, and $v_k^t$ is a transposition of the kth component vector. $L_{orthogonal}$ is the orthogonal loss 1081.

The training apparatus calculates a temporary output 1009 by propagating a temporary embedding vector 550 from the feature extraction layer 510 to a combination layer 530 via the pooling layer 520. For example, as illustrated, the training apparatus calculates a temporary attention weight from the temporary component vectors 1021 based on an attention layer 532 of the data recognition model 590. In this example, the training apparatus generates normalized temporary vectors by normalizing the temporary component vectors 1021. The training apparatus generates the temporary embedding vector 550 by applying the temporary attention weight to the temporary component vectors 1021, for example, the normalized temporary vectors. The training apparatus calculates weighted component vectors by applying the temporary attention weight to each of the temporary component vectors 1021. The training apparatus generates the temporary embedding vector 550 by linearly combining the weighted component vectors.

The training apparatus calculates a recognition loss 1082 between the temporary output 1009 recognized from the temporary embedding vector 550 and a training output 1092 provided for the training input 1091 as represented by Equation 6.

$$L_{softmax} = -\frac{\exp(\omega_s^t \cdot \tilde{v} + b)}{\sum_{spk} \exp(\omega_{spk}^t \cdot \tilde{v} + b)} \quad \text{[Equation 6]}$$

In Equation 6, $\tilde{v}$ is the temporary embedding vector 550. $w_s^t$ and $w_{spk}^t$ are a weight based on the temporary output 1009 and a weight based on the training output 1092, respectively. In Equation 6, b is a constant, $L_{softmax}$ is the recognition loss 1082, and spk is an index indicating an individual speaker to be included for training.

The training apparatus calculates a total loss 1083 based on the orthogonal loss 1081 and the recognition loss 1082. For example, the total loss 1083 may be represented by Equation 7.

$$L_{total} = L_{softmax} + L_{orthogonal} \quad \text{[Equation 7]}$$

The training apparatus updates a parameter of the data recognition model 590 such that the total loss 1083 is minimized. For example, the training apparatus may repeat the updating of a parameter of the data recognition model 590 until the total loss 1083 converges. The training apparatus may train a data recognition apparatus through back-propagation learning. For example, in the training, connection weights between nodes of different hidden layers may be recursively adjusted through back propagation, until the data recognition model 550 is trained with a desired accuracy rate or below a maximum error rate.

Figure 11:
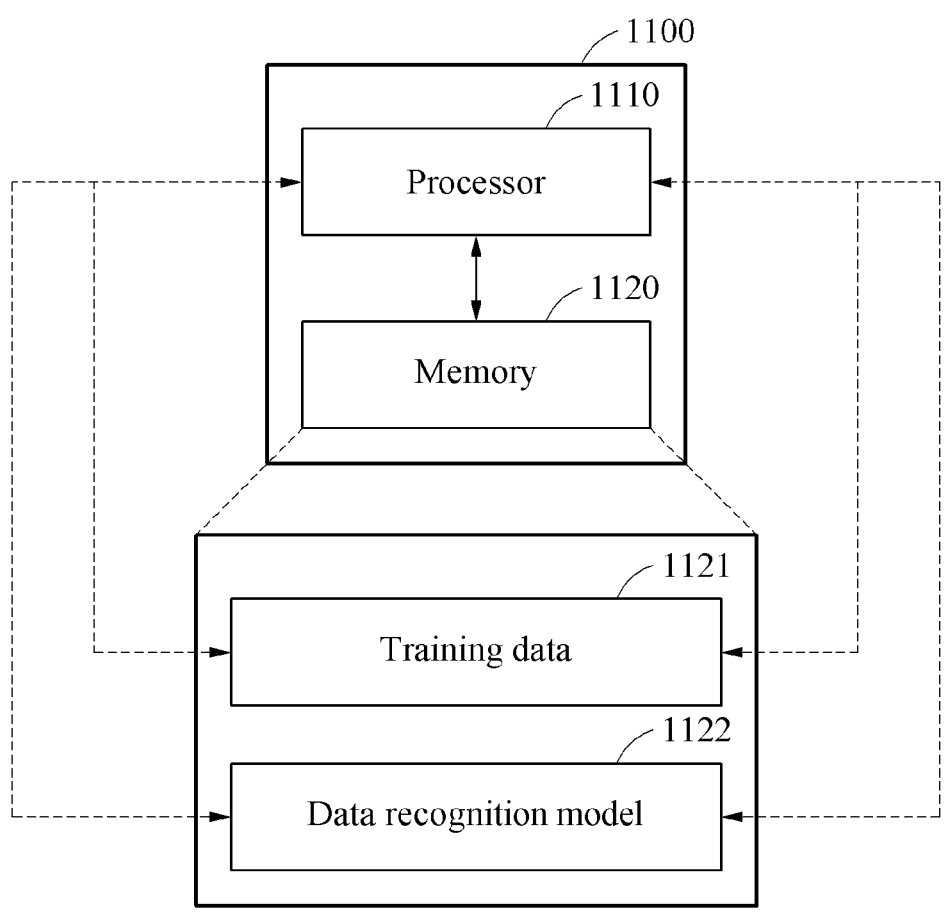
FIG. 11 is a diagram illustrating an example of a training apparatus.

FIG. 11 is a diagram illustrating an example of a training apparatus 1100.

Referring to FIG. 11, the training apparatus 1100 includes a processor 1110 and a memory 1120.

The processor 1110 may calculate an orthogonal loss for temporary component vectors extracted from a training input based on a feature extraction layer and a pooling layer of a data recognition model 1122. The processor 1110 may calculate a recognition loss for a temporary embedding vector calculated by recombining the temporary component vectors based on a combination layer of the data recognition model 1122. The processor 1110 may train the data recognition model 1122 based on the orthogonal loss and the recognition loss. However, operations of the processor 1110 are not limited to those described above, and thus the processor 1110 may perform one or more operations described above with reference to FIG. 10.

The memory 1120 may store the data recognition model 1122 and training data 1121. The memory 1120 may store a temporary model and a temporary parameter corresponding to the temporary model while the data recognition model 1122 is being trained. When the training is completed, the memory 1120 may store the trained data recognition model 1122 and a parameter corresponding to the trained data recognition model 1122. An architecture of the data recognition model 1122 may be similar to one described above with reference to FIG. 5.

Figure 12:
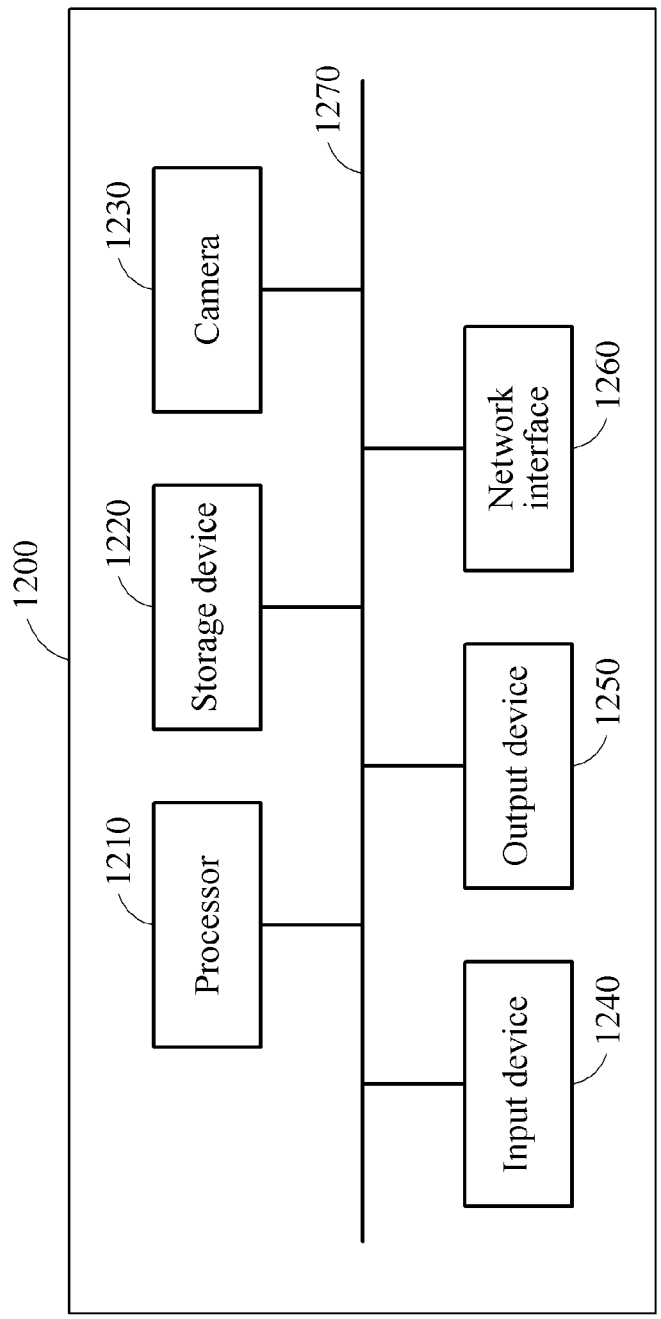
FIG. 12 is a diagram illustrating an example of a computing apparatus for performing data recognition.

FIG. 12 is a diagram illustrating an example of a computing apparatus 1200.

Referring to FIG. 12, the computing apparatus 1200 may be configured to recognize input data using the data recognition method described herein. In an example, the computing apparatus 1200 may correspond to the data recognition apparatus 800 described above with reference to FIG. 8. The computing apparatus 1200 may be, for example, an image processing device, a smartphone, a wearable device, a tablet computer, a netbook, a laptop, a desktop, a personal digital assistant (PDA), a set-top box, a home appliance, a biometric door lock, a security device, a vehicle starter, or the like. The computing apparatus 1200 may include the functions of the data recognition apparatus 800 described above with reference to FIG. 8. In addition, the computing apparatus 1200 may also include the functions of the training apparatus 1100 described above with reference to FIG. 11.

Referring to FIG. 12, the computing apparatus 1200 includes a processor 1210, a storage device 1220, a camera 1230, an input device 1240, an output device 1250, and a network interface 1260. The processor 1210, the storage device 1220, the camera 1230, the input device 1240, the output device 1250, and the network interface 1260 may communicate with one another through a communication bus 1270.

The processor 1210 may execute functions and instructions. For example, the processor 1210 may process instructions stored in the storage device 1220. The process 1210 may perform one or more operations described above with reference to FIGS. 1 through 11.

The storage device 1220 may store information and data needed for the processor 1210 to perform the operations. The storage device 1220 may include a computer-readable storage medium or computer-readable storage device. The storage device 1220 may store instructions to be executed by the processor 1210, and store related information while software or an application is being executed by the computing apparatus 1200.

The camera 1230 may capture an image including a plurality of image frames.

The input device 1240 may receive an input from a user through a tactile, video, audio, or tough input. The input device 1240 may include, for example, a keyboard, a mouse, a touchscreen, a microphone, and other devices that may detect an input from a user and transmit the detected input to the computing apparatus 1200. For example, the input device 1240 may obtain speech data as input data from a user.

The output device 1250 may provide an output of the computing apparatus 1200 to a user through a visual, auditory, or tactile channel. The output device 1250 may include, for example, a display, a touchscreen, a speaker, a vibration generator, and other devices that may provide an output to a user. The network interface 1260 may communicate with an external device through a wired or wireless network.

The speech recognition server 130 of FIG. 1, the processor 810, the memory 820, and the data acquirer 830 of FIG. 8, the processor 1110 and the memory 1120 of FIG. 11, and the processor 1210, the network interface 1260, and the communication bus 1270 of FIG. 12 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 3-7, 9, and 10 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor-implemented data recognition method, comprising:
    extracting, by one or more processors, a feature map from input data based on a feature extraction layer of a data recognition model;
    pooling, by the one or more processors, component vectors from the feature map based on a pooling layer of the data recognition model, wherein the pooling of the component vectors comprises extracting, from the feature map, component vectors that are orthogonal to each other;
    generating, by the one or more processors, an embedding vector by recombining the component vectors based on a combination layer of the data recognition model; and
    recognizing, by the one or more processors, the input data based on the embedding vector, the recognizing of the input data including one of a speaker recognition and an image recognition.

2. The data recognition method of claim 1, wherein the recognizing of the input data comprises indicating, among registered users, a user mapped to a registration vector verified to match the embedding vector.

3. A processor-implemented data recognition method, comprising:
    extracting, by one or more processors, a feature map from input data based on a feature extraction layer of a data recognition model;
    pooling, by the one or more processors, component vectors from the feature map based on a pooling layer of the data recognition model;
    generating, by the one or more processors, an embedding vector by recombining the component vectors based on a combination layer of the data recognition model; and
    recognizing, by the one or more processors, the input data based on the embedding vector, the recognizing of the input data including one of a speaker recognition and an image recognition,
    wherein the pooling of the component vectors comprises:
    extracting, from the feature map, a first component vector based on the pooling layer; and
    extracting, from the feature map, a second component vector having a cosine similarity to the first component vector that is less than a threshold similarity, based on the pooling layer.

4. The data recognition method of claim 1, wherein the generating of the embedding vector comprises:
    calculating an attention weight of the component vectors from the component vectors through an attention layer; and
    calculating the embedding vector by applying the attention weight to the component vectors.

5. The data recognition method of claim 1, wherein generating of the embedding vector comprises:
    calculating an attention weight of the component vectors from the component vectors through an attention layer;
    generating weighted component vectors by applying the attention weight to each of the component vectors; and
    calculating the embedding vector by linearly combining the weighted component vectors.

6. The data recognition method of claim 1, wherein the generating of the embedding vector comprises generating normalized component vectors by normalizing the component vectors.

7. The data recognition method of claim 1, wherein the extracting of the feature map comprises extracting a number of feature maps using the feature extraction layer, wherein the feature extraction layer includes a convolutional layer, and wherein the number of feature maps is proportional to a number of component vectors to be pooled.

8. A non-transitory computer-readable storage medium storing instructions that, when executed by a processor, cause the processor to perform the data recognition method of claim 1.

9. A data recognition apparatus, comprising:
    a memory configured to store a data recognition model comprising a feature extraction layer, a pooling layer, and a combination layer; and
    a processor configured to:
    extract a feature map from input data based on the feature extraction layer;
    pool component vectors from the feature map based on the pooling layer, wherein the pooling of the component vectors comprises extracting, from the feature map, component vectors that are orthogonal to each other;
    generate an embedding vector by recombining the component vectors based on the combination layer; and
    recognize the input data based on the embedding vector, the recognizing of the input data including one of a speaker recognition and an image recognition.

10. A speaker recognition method, comprising:
    extracting, based on a feature extraction layer of a speech recognition model, a feature map from speech data input by a speaker;
    pooling component vectors from the feature map based on a pooling layer of the speech recognition model, wherein the pooling of the component vectors comprises extracting, from the feature map, component vectors that are orthogonal to each other;
    generating an embedding vector by recombining the component vectors based on a combination layer of the speech recognition model;
    recognizing the speaker based on the embedding vector; and
    indicating a recognition result of the recognizing the speaker.

11. The speaker recognition method of claim 10, wherein the indicating of the recognition result comprises verifying whether the speaker is a registered user based on a result of comparing the embedding vector to a registration vector corresponding to the registered user.

12. The speaker recognition method of claim 11, wherein the indicating of the recognition result further comprises:
in response to a cosine similarity between the embedding vector and the registration vector exceeding a threshold recognition value, determining verification of the speech data to be successful; and
in response to the verification being determined to be successful, unlocking a device.

13. A speaker recognition apparatus, comprising:
a memory configured to store a speech recognition model including a feature extraction layer, a pooling layer, and a combination layer; and
a processor configured to
extract, based on the feature extraction layer, a feature map from speech data input by a speaker,
pool component vectors from the feature map based on the pooling layer, wherein the pooling of the component vectors comprises extracting, from the feature map, component vectors that are orthogonal to each other,
generate an embedding vector by recombining the component vectors based on the combination layer,
recognize the speaker based on the embedding vector, and
indicate a recognition result of the recognizing the speaker.

14. The speaker recognition apparatus of claim 13, wherein the recognizing of the speaker based on the embedding vector comprises recognizing the speaker based on a similarity between the embedding vector and a registration vector corresponding to a registered user.

15. The speaker recognition apparatus of claim 13, wherein the recombining the component vectors based on the combination layer comprises generating weighted component vectors by applying an attention weight to the component vectors, and linearly combining the weighted component vectors.

16. The speaker recognition apparatus of claim 13, wherein the extracting of the feature map comprises extracting convolved data from the speech data based on a convolutional layer of the feature extraction layer, and pooling the convolved data.

17. An image recognition apparatus, comprising:
a memory configured to store an image recognition model including a feature extraction layer, a pooling layer, and a combination layer; and
a processor configured to
extract, based on the feature extraction layer, a feature map from image data obtained from a captured image of user,
pool component vectors from the feature map based on the pooling layer, wherein the pooling of the component vectors comprises extracting, from the feature map, component vectors that are orthogonal to each other,
generate an embedding vector by recombining the component vectors based on the combination layer,
recognize the user based on the embedding vector, and
indicate a recognition result of the recognizing the user.

* * * * *